(12) United States Patent
Tanaka et al.

(10) Patent No.: US 7,856,174 B2
(45) Date of Patent: Dec. 21, 2010

(54) APPARATUS AND METHOD FOR IMAGE PICKUP

(75) Inventors: Toshiyuki Tanaka, Yokohama (JP); Toshihiro Hamamura, Yokohama (JP)

(73) Assignee: Samsung Electronics Co., Ltd., Suwon-si (KR)

(*) Notice: Subject to any disclaimer, the term of this patent is extended or adjusted under 35 U.S.C. 154(b) by 557 days.

(21) Appl. No.: 11/729,908

(22) Filed: Mar. 29, 2007

(65) Prior Publication Data
US 2007/0230932 A1  Oct. 4, 2007

(30) Foreign Application Priority Data
Apr. 3, 2006  (JP) ............... 2006-101423

(51) Int. Cl.
*G03B 17/00* (2006.01)
(52) U.S. Cl. ............ 396/55; 348/208.4; 348/241
(58) Field of Classification Search ............ 396/55; 348/208.12
See application file for complete search history.

(56) References Cited

U.S. PATENT DOCUMENTS

| | | | |
|---|---|---|---|
| 6,452,633 B1* | 9/2002 | Merrill et al. | 348/302 |
| 6,956,978 B2* | 10/2005 | Staudacher et al. | 382/274 |
| 7,424,213 B2* | 9/2008 | Imada | 396/55 |
| 7,554,585 B2* | 6/2009 | Masuyama | 348/243 |
| 2002/0167600 A1* | 11/2002 | Baer | 348/243 |
| 2005/0018253 A1* | 1/2005 | Takeda | 358/474 |
| 2005/0110895 A1 | 5/2005 | Masuyama | |
| 2007/0212045 A1* | 9/2007 | Yamasaki | 396/55 |

FOREIGN PATENT DOCUMENTS

| | | | |
|---|---|---|---|
| JP | 2003-116064 A | | 4/2003 |
| JP | 2003319269 A | * | 11/2003 |
| JP | 2005-159447 A | | 6/2005 |
| JP | 2005-295302 A | | 10/2005 |
| JP | 2006-050139 A | | 2/2006 |

OTHER PUBLICATIONS machine translation of JP2003-319269.*
Office Action established for JP2006-101423.

* cited by examiner

*Primary Examiner*—Clayton E LaBalle
*Assistant Examiner*—Linda B Smith
(74) *Attorney, Agent, or Firm*—Drinker Biddle & Reath LLP

(57) ABSTRACT

An apparatus and method for image pickup capable of reducing noise in the images to reduce the effect of shaking due to, for example, hand movement. The image pickup apparatus and method can employ an exposure photographing unit for photographing at least one exposure image at predetermined time intervals using time-division exposure in a light exposure state, a dark frame photographing unit for photographing at least one dark frame at predetermined time intervals using time-division exposure in a dark state, a subtracting processor for subtracting the dark frames from the exposure images to reduce noise in the exposure images, and an image combiner for combining the plurality of reduced noise exposure images.

14 Claims, 12 Drawing Sheets

FIG. 4
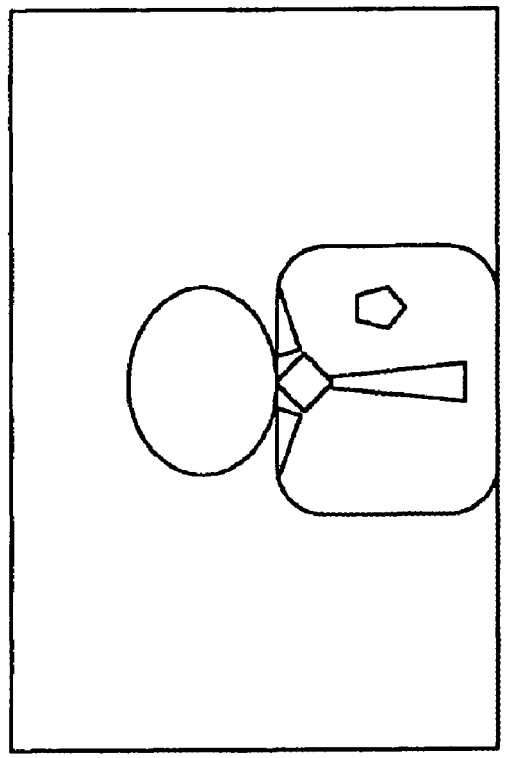
1/8 SECOND
IMAGE B
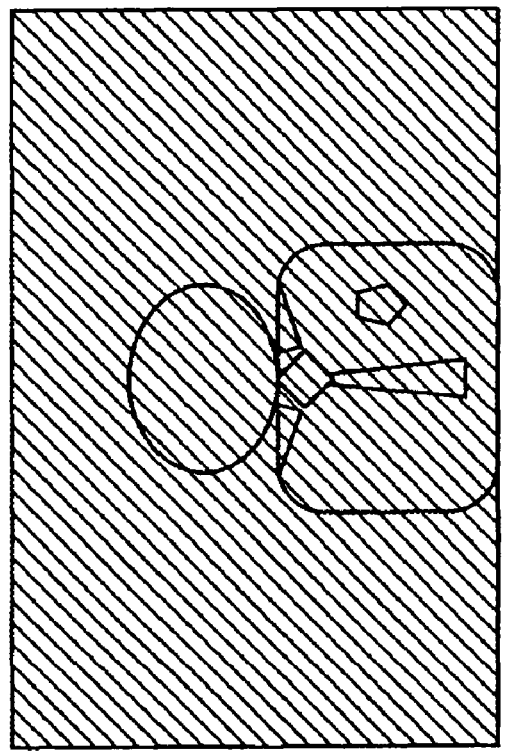
1/64 SECOND
IMAGE A

APPARATUS AND METHOD FOR IMAGE PICKUP

CROSS-REFERENCE TO RELATED PATENT APPLICATIONS

This application claims the benefit of Japanese Patent Application No. 2006-101423, filed on Apr. 3, 2006, in the Japanese Intellectual Property Office, the disclosure of which is incorporated herein in its entirety by reference.

BACKGROUND OF THE INVENTION

1. Field of the Invention

The present invention relates to an apparatus and method for image pickup. More particularly, the present invention relates to an apparatus and method for reducing noise and the effect of shaking in an image.

2. Description of the Related Art

Several conventional techniques exist for reducing the effect of shaking on a photographic image. For example, one method shifts a position of a lens with respect to a photographing surface in a direction opposite to that in which the photographer's hand is shaking to reduce the effect of the shaking when taking pictures. In another method, a plurality of images are photographed using a high-speed shutter, and the photographed images are combined based on characteristic points of the photographed subject to electronically reduce the effect of shaking, as disclosed in Japanese Laid-open Patent No. 2005-295302. That method is particularly effective to photograph images using low shutter speed where there is a low intensity of light. In addition, Japanese Laid-open Patent No. 2003-116064 discloses a method of removing fixed pattern noise by subtracting images photographed in a dark state from an image photographed in an exposure state, in a low light intensity environment.

According to a conventional noise reduction method, a plurality of images taken using time-division exposure (hereinafter referred to as time-division images) photographed using a high shutter speed are combined, and images photographed in a dark state using low shutter speed are subtracted from the combined images to reduce the fixed pattern noise. However, if the electronic shaking reduction technique and the technique of subtracting the dark frames are combined, the time-division images including fixed pattern noises are combined. In this event, the fixed pattern noise of each image is distributed in the image area, and thus, the fixed pattern noises are not accurately removed when the dark frames are subtracted from the combined image.

SUMMARY OF THE INVENTION

An embodiment of the present invention provides an apparatus and method for image pickup capable of reducing noise in images. In particular, according to the present invention, noise in images can be reduced while also performing a process for reducing the effect of shaking on the image being photographed.

According to an aspect of the present invention, an image pickup apparatus electronically reduces the effect of shaking, due to hand movement or other movement, by combining a plurality of images that are photographed at predetermined time intervals using time-division exposure. The apparatus includes an exposure photographing unit for photographing at least one exposure image at predetermined time intervals using time-division exposure in a light exposure state, and a dark frame photographing unit for photographing at least one dark frame at predetermined time intervals using time-division exposure in a dark state. The apparatus further employs a subtracting processor for subtracting the dark frames from the exposure images to reduce noise in the images, and an image combiner for combining the plurality of images photographed at the predetermined time intervals.

The exposure photographing unit may photograph at least one exposure image at predetermined time intervals using time-division exposure in a light exposure state. Also, the dark frame photographing unit may photograph at least one dark frame at predetermined time intervals using time-division exposure in a dark state. The subtracting processor may subtract the dark frames from the exposure images to reduce noise in the images. The fixed pattern noises can be reduced from the exposure images, and noise in the combined image may therefore be reduced effectively.

The dark frame photographing unit may photograph one dark frame, and the subtracting processor may subtract the one dark frame from each of the exposure images that are photographed at predetermined time intervals using time-division exposure to reduce noise in the images. The noise reducing process can be performed using one dark frame. Thus, the amount of memory required for the process can be reduced, and the process can be performed at high speed.

The exposure photographing unit and the dark frame photographing unit may photograph the exposure images and the dark frames alternately, and the subtracting processor may subtract the dark frame, which is photographed immediately after each exposure image is photographed, from the corresponding exposure image to reduce the noise in the image. A time difference between the high shutter speed image and the dark frame is small, and thus, the noise at the time when the high shutter speed image is photographed can be accurately represented by the dark frame, enabling noise reduction with high accuracy.

The apparatus may further include a dark frame interpolating unit for performing an interpolation based on at least two dark frames, and generating a dark frame corresponding to at least one point in time between when the dark frames are photographed, such that the subtracting processor subtracts the dark frame obtained by the interpolation from the exposure images to reduce the noise in the image. The highly accurate noise reduction can be performed while reducing processing time and memory capacity.

Another aspect of the present invention provides an image pickup apparatus for electronically reducing the effect of shaking by combining a plurality of images that are photographed at predetermined time intervals using time-division exposure. The apparatus includes an exposure photographing unit for photographing at least one exposure image at predetermined time intervals using time-division exposure in a light exposure state, and a dark frame photographing unit for photographing at least one dark frame at predetermined time intervals using the time-division exposure in a dark state. The apparatus further comprises a feature point detector for detecting each feature point of the exposure images, a feature recording unit for recording positions of the feature point, and an image combiner combining the exposure images after shifting the exposure images so as to form a combined exposure image having coincided feature point, and combining the dark frames corresponding to the exposure images to form a combined dark frame after shifting the dark frames according to the shifted movements of the exposure images. The apparatus also includes a subtracting processor for subtracting the combined dark frame from the combined exposure image to reduce noise in the image.

The exposure photographing unit may photograph at least one exposure image at predetermined time intervals using time-division exposure in a light exposure state. The dark frame photographing unit may photograph at least one dark frame at predetermined time intervals using the time-division exposure in a dark state. The feature point detector may detect each feature point of the exposure images, and the feature recording unit may record positions of the feature point. The image combiner may combine the exposure images after shifting the exposure images so as to form a combined exposure image having coincided feature point, and combine the dark frames corresponding to the exposure images to form a combined dark frame after shifting the dark frames according to the shifted movements of the exposure images. The subtracting processor may subtract the combined dark frame from the combined exposure image to reduce noise in the image. The noise reduction of the combined image can be performed with one process.

Another aspect of the present invention provides an image pickup method of electronically reducing the effect of shaking by combining a plurality of images photographed at predetermined time intervals using time-division exposure. The method includes operations of photographing at least one exposure image at predetermined time intervals using time-division exposure in a light exposure state, photographing at least one dark frame at predetermined time intervals using time-division exposure in a dark state, combining the plurality of images, and subtracting the dark frames from the exposure images that are photographed at predetermined time intervals using time-division exposure for reducing noise.

In photographing the exposure image, at least one exposure image may be photographed at predetermined time intervals using time-division exposure in a light exposure state. In photographing the dark frame, at least one dark frame may be photographed at predetermined time intervals using time-division exposure in a dark state. In the subtracting operation, the dark frames may be subtracted from the exposure images that are photographed at predetermined time intervals using time-division exposure for reducing noise. The fixed pattern noise can be reduced from the exposure images, and the noise of combined image can be effectively reduced.

In photographing the at least one dark frame, one dark frame may be photographed using time-division exposure, and in the subtracting of the images, the dark frame may be subtracted from each of the exposure images photographed at predetermined time intervals using time-division exposure to reduce the noise in the images. The noise reduction can be performed using one dark frame. Thus, the required memory capacity can be reduced, and the process can be performed at high speed.

In photographing the exposure images and the photographing of the dark frames, the exposure images and the dark frames may be photographed alternately. When subtracting the images, for each exposure image, the dark frame that is photographed immediately after an exposure image is photographed may be respectively subtracted from the corresponding exposure image. A time difference between the high shutter speed image and the dark frame is small, and thus, the noise at the time when the high shutter speed image is photographed can be accurately represented by the dark frame, resulting in noise with high accuracy.

The method may further include the operations of performing an interpolation based on at least two dark frames, and generating a dark frame corresponding to at least one point in time between when the two dark frames are photographed, such that the subtracting of images, for each exposure image, is performed by subtracting, from an exposure image, a corresponding dark frame obtained by the interpolation to reduce the noise in the image. The highly accurate noise reduction can thus be performed while reducing processing time and memory capacity.

A further aspect of the present invention provides an image pickup method of electronically reducing the effect of shaking by combining a plurality of images photographed at predetermined time intervals using time-division exposure. The method includes photographing one or more exposure images at predetermined time intervals using time-division exposure in a light exposure state, photographing one or more dark frames at predetermined time intervals using the time-division exposure in a dark state, detecting each feature point of the exposure images, and recording positions of the feature points of the exposure images. The method further includes the operations of combining exposure images by shifting the exposure images so that the feature points of the images can coincide to form a combined exposure image, combining the dark frames corresponding to the exposure images by shifting the dark frames according to the shifted movements of the exposure images combined dark frame, and subtracting the combined dark frame from the combined exposure image to reduce noise in the image.

In photographing the exposure image, one or more exposure images may be photographed at predetermined time intervals using time-division exposure in a light exposure state. In photographing of the dark frame, one or more dark frames may be photographed at predetermined time intervals using the time-division exposure in a dark state. In detecting the feature point, each feature point of the exposure images may be detected. In combining the images, the exposure images may be combined after shifting the exposure images so that the feature points of the images can coincide to form a combined exposure image, and the dark frames may be combined corresponding to the exposure images by shifting the dark frames according to the shifted movements of the exposure images combined dark frame. In performing the subtracting operation, the combined dark frame may be subtracted from the combined exposure image to reduce noise in the image. The noise reduction of the combined image can be performed by performing one subtracting process.

The photographing apparatus may also include, for example, an exposure controller for determining an appropriate shutter speed, by which an appropriate exposure can be obtained, based on the brightness of the subject. The photographing apparatus may further include a division photographing number setting unit for calculating the number of exposures to be photographed by dividing the appropriate shutter speed by a high shutter speed, in a case where the high shutter speed is set, and an exposure photographing unit for photographing at least one exposure image at predetermined time intervals using time-division exposure in a light exposure state. In addition, the photographing apparatus may include a brightness recording unit for recording brightness value at every exposure image; a dark frame photographing unit for photographing at least one dark frame at predetermined time intervals using time-division exposure in a dark state, and a subtracting processor for subtracting the dark frames from the exposure images to reduce noise in the image. The photographing apparatus may further include a feature point detector for detecting features by calculating the difference between adjacent pixels, and an image combiner for combining subtractive images based on the feature points.

The apparatus may further include a dark frame photographing controller for controlling dark frame so as to be photographed after predetermined number of exposure images are photographed. Also, the subtracting processor may subtract one dark frame from each of the exposure image.

Alternatively, the dark frame photographing controller can control the dark frame so as to be photographed right after the initial time-division image is photographed. The subtracting processor may then subtract one dark frame from each of the exposure image whenever the dark frame is photographed.

Also, the dark frame photographing controller may operate so that a first dark frame is photographed after an initial exposure image is photographed, and a second dark frame is photographed after a final exposure image is photographed. In this case, a dark frame interpolating unit generates dark frames corresponding to photographing times of the exposure images between the initial exposure image and the final exposure image by interpolating brightness data of the first and second dark frames. The subtracting processor may subtract the dark frame corresponding to the photographing time of the exposure image from the exposure image. Like the interpolation between the photographing times, the dark frame may be photographed at a discretionary point between the first and second time points, and the dark image corresponding to a discretionary time point between the first and second time points can be calculated based on the dark frames photographed at the time points using the interpolation. Also, the discretionary time point is not limited to one time point, but can be a plurality of time points.

BRIEF DESCRIPTION OF THE DRAWINGS

The above and other features and advantages of the present invention will become more apparent by describing in detail exemplary embodiments thereof with reference to the attached drawings in which:

FIG. 4 is a view of samples of a high shutter speed image and a low shutter speed image;

DETAILED DESCRIPTION OF THE EMBODIMENTS

Figure 1:
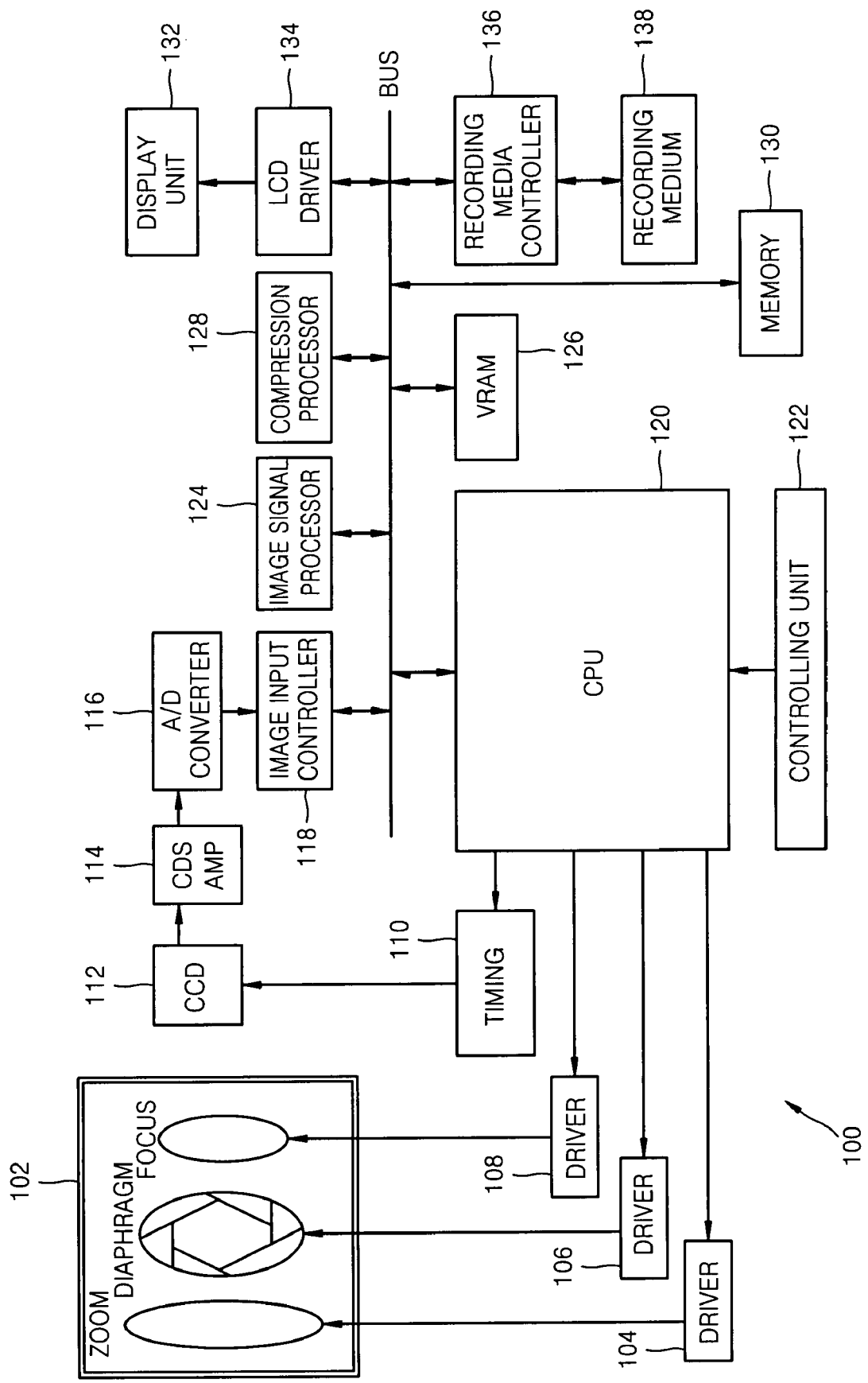
FIG. 1 is a block diagram of an image pickup apparatus according to an embodiment of the present invention.

Embodiments of the present invention will now be described more fully with reference to the accompanying drawings, in which exemplary like reference numerals denote like elements.

FIG. 1 illustrates an example of an image pickup apparatus according to an embodiment of the present invention.

The image pickup apparatus 100 shown in FIG. 1 includes an optical system 102, drivers 104, 106, and 108, a timing controller 110, a charge coupled device (CCD) 112, a correlated double sampling (CDS)/amplifier (AMP) 114, an analog/digital (A/D) converter 116, and an image input controller 118. The apparatus further includes a central processing unit (CPU) 120, a controlling unit 122, an image signal processor 124, a video random access memory (VRAM) 126, a compression processor 128, a memory 130, a display unit 132, a liquid crystal display (LCD) driver 134, a recording media controller 136, and a recording medium 138.

The optical system 102 focuses the light representing an image of a subject onto the CCD 112 through a lens. The driver 104 drives a zoom device of the optical system 102. The driver 106 drives a diaphragm device of the optical system 102, and the driver 108 drives a focusing device of the optical system 102. The timing controller 110 controls an exposure period or reading of electric charges by each of pixels forming the CCD 112. The CCD 112 is formed of devices that can perform photoelectrical conversion, and generates electric signals according to the light received by the devices. The CDS/AMP 114 removes low frequency noise included in the electric signals obtained from the CCD 112, and simultaneously, amplifies the electric signals to a predetermined level. The A/D converter 116 converts analog electric signals into digital signals. The image input controller 118 receives an operation command from the CPU 120, and controls operations of the CCD 112, CDS/AMP 114, and the A/D converter 116 relating the input of images. The controlling unit 122 includes, for example, a power switch, a mode conversion unit, and a shutter button, and can be used, by a user, to set a shutter speed, an international standard organization (ISO) sensitivity or any other appropriate features. In addition, the image signal processor 124 calculates an evaluation value of an exposure amount that is set by controlling an automatic exposure (AE), and calculates an evaluation value of a focal distance that is set by controlling an auto-focus (AF).

The VRAM 126 in this example is a memory for display images, and includes a memory having a plurality of channels so as to write display images and read the images to and from the display unit 132 simultaneously. The compression processor 128 compresses the input image data in a joint photographic experts group (JPEG) compression format or in a Lempel-Ziv-Welch (LZW) compression format. The memory 130 may be a semiconductor recording device such as a synchronous DRAM (SDRAM), and the memory 130 may include time-division photographed images that are picked using the high speed shutter. In addition, a combined image that is combined by the image signal processor 124 can be recorded on the memory 130 or an operational program of the CPU 120 can be stored in the memory 130. Also, the memory can perform as a feature point detector recording the features detected from photographed exposure images or dark frames. Exposure image is an image photographed in a light exposure state, and dark frame is an image photographed without exposing the CCD 112 to any external light, for example, by keeping the shutter of a CCD camera closed.

The display unit 132 in this example includes a display unit such as an LCD, and an image read from the VRAM 126 is displayed on the display unit 132. The LCD driver 134 drives the display unit 132 and controls the output of the display unit 132.

The recording media controller 136 controls recording or reading of the image data onto or from the recording medium 138, or setting information recorded on the recording medium 138. The recording medium 138 can be an optical recording medium, an optical magnetic disk, a magnetic disk, a semiconductor recording medium, or any other suitable medium, and can record the photographed image data. In addition, the recording medium 138 can be attached/detached to/from the image pickup apparatus 100.

Figure 2:
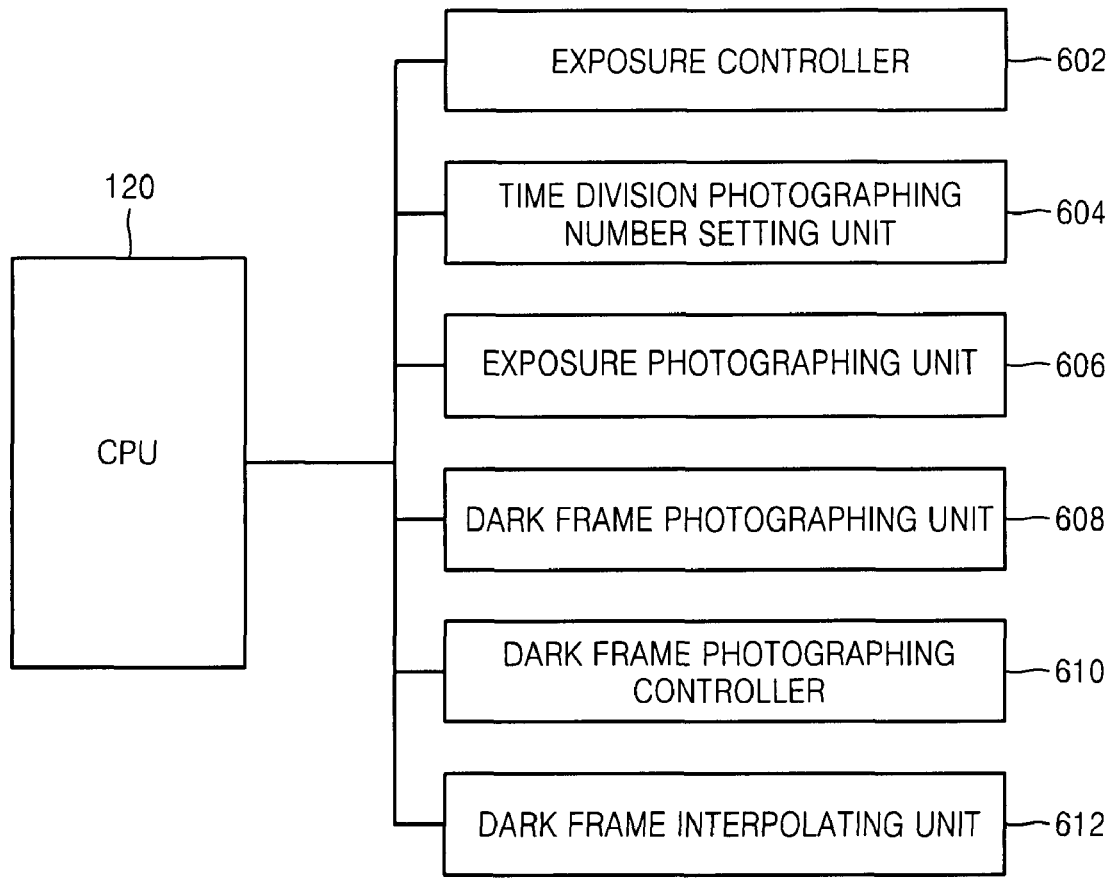
FIG. 2 is a block diagram illustrating examples of functions of a central processing unit (CPU) in the image pickup apparatus of FIG. 1.

Referring to FIG. 2, the CPU 120 in this example includes an exposure controller 602, a time division photographing number setting unit 604, an exposure photographing unit 606, a dark frame photographing unit 608, a dark frame photographing controller 610, and a dark frame interpolating unit 612. That is, functions performed by the above elements can be performed by the CPU 120, or each of the elements can be formed as independent hardware. The exposure controller 602 determines an appropriate shutter speed, by which an appropriate exposure can be obtained, based on the brightness of the subject. That is, an automatic exposure control can be performed. The division photographing number setting unit 604 calculates the number of exposures to be photographed, and ensures that the appropriate amount of light required to expose the images is present, by combining the time-division images that are photographed with the shutter speed that is calculated by dividing the appropriate shutter speed by a high shutter speed, in a case where the high shutter speed is set.

The exposure photographing unit 606 photographs timedivision images using the high shutter speed in an exposure state. The photographing operation is controlled by the CPU 120, however, the photographing itself can be controlled by the optical system 102, the CCD 112, and the image input controller 118. The dark frame photographing unit 608 photographs at least one dark frame using the high shutter speed in the dark state. As will be described later, the dark frame can be photographed after all of the time-division images are photographed, or can be photographed whenever each of the time-division images is photographed. In addition, the dark frame can be photographed right after the initial time-division image is photographed. The dark frame photographing controller 610 controls the photographing operation of the dark frames.

The dark frame interpolating unit 612 generates an interpolated image from a plurality of dark frames. In more detail, a brightness value corresponding to a discretionary time point between the photographing times is calculated from time series data of the brightness values corresponding to pixels of the plurality of dark frames photographed at two or more time points through a linear interpolation or a non-linear interpolation. When the brightness values corresponding to the pixels are calculated by the interpolating, the dark frames having brightness values corresponding to each of the pixels can be formed.

Figure 3:
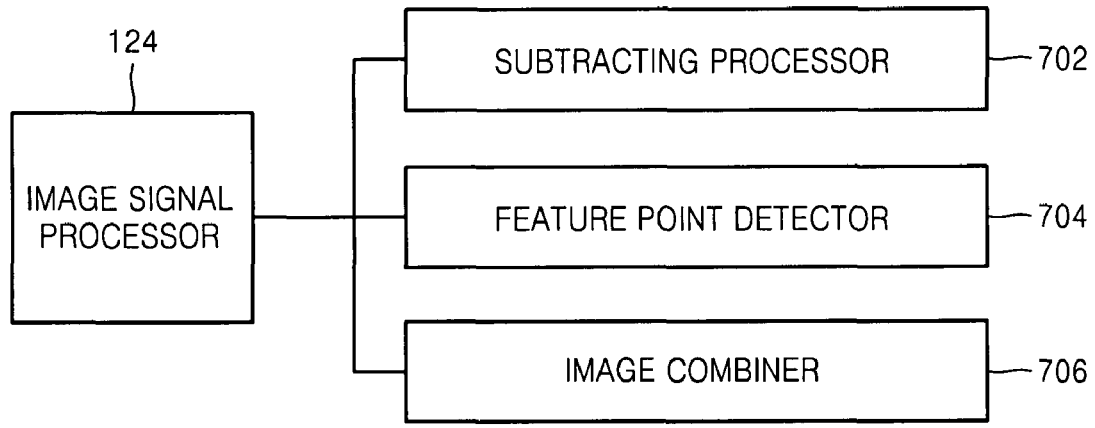
FIG. 3 is a block diagram illustrating examples of functions of an image signal processor in the image pickup apparatus of FIG. 1.

Referring to FIG. 3, the image signal processor 124 includes a subtracting processor 702, a feature point detector 704, and an image combiner 706. The subtracting processor 702 subtracts one dark frame from one time-division image to generate a subtracted image. That is, the brightness values of the pixels in the dark frame are subtracted from the brightness values of corresponding pixels in one time-division image, and thus, the brightness values of the pixels in the subtracted image can be calculated. The feature point detector 704 detects features of the pixels in the time-division image or the subtracted image. That is, the difference between adjacent pixels is calculated, and the point where the difference is great is detected. In particular, edges of the subject image can be detected, and the edges can be detected as the features. The image combiner 706 combines the subtracted images generated through the above processes to generate a combined image.

Hereinafter, an image pickup method using the image pickup apparatus will be described.

An example of a general electronic shaking reduction method will first be described. It is assumed in this example that an appropriate exposure for a scene is obtained when the shutter speed is ⅛ second and the diaphragm value (F) is 2.8. Generally, when a focal distance is longer, shaking, due to hand movement or otherwise, has more of an effect on the image. However, even when the focal distance is short, shaking can have an effect on the image at the shutter speed of ⅛ second. On the other hand, when the focal distance is 28 mm, shaking will generally not affect an image photographed at a shutter speed of about 1/64 second. Therefore, the image pickup apparatus having the electronic shaking reduction function photographs 8 images at the shutter speed of 1/64 second instead of photographing one image at the shutter speed of ⅛ second, and then, combines the images to reduce the effect of shaking.

In general, the shutter speeds, at which shaking affects photographed images, are shutter speeds corresponding to times that are longer than a reciprocal of the focal distance [mm] that is converted into the focal distance of a 35 mm film camera. For example, when the focal distance is 200 mm, images photographed using shutter speeds longer than 1/200 second may be affected by shaking. In addition, when a photographer performs zooming in, shaking often occurs, and thus, high shutter speed is desired.

Figure 5:
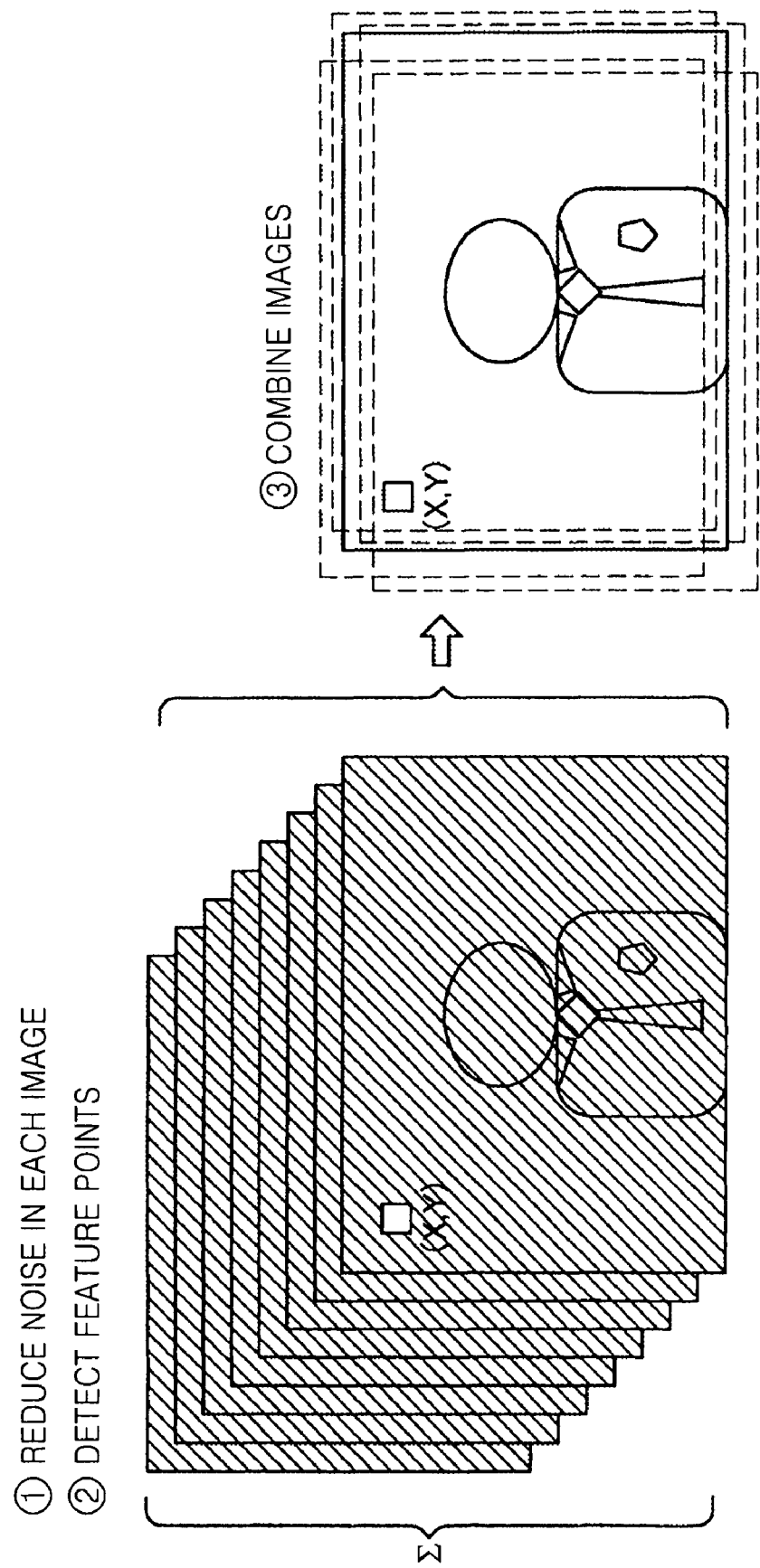
FIG. 5 is a view illustrating an example of processes of combining high shutter speed images.

FIG. 4 shows samples of images photographed at the shutter speed of 1/64 second and the shutter speed of ⅛ second. Image A that is photographed at the high shutter speed of 1/64 second generally lacks exposure and is dark. However, 8 images photographed at the high shutter speed are combined to generate the image having the brightness of Image B. As shown in FIG. 5, the noise is reduced in each image in step (1), the features of the images are detected in step (2), and the image combination is performed based on the features in step (3). Therefore, the effect of shaking can be reduced.

The electronic shaking reduction function, in which a plurality of time-division images are photographed at a shutter speed higher than the appropriate shutter speed and then combined, is effective for scenes of low brightness. The high shutter speed can be limited by various conditions, such as a sensitivity or a size of a photographing device, and corresponding focal distance. However, the shutter speed, by which the effect of shaking can be reduced, can be set in advance. The appropriate shutter speed is set by the automatic exposure control. Therefore, the number of time-division images photographed using the high shutter speed can be calculated by dividing the appropriate shutter speed by a predetermined high shutter speed. The high shutter speed or the number of time division images to be photographed can be set by the user. In addition, the high shutter speed or the number of time division images to be photographed can be set according to the brightness of the subject and the kind of used optical system.

The features can be detected by analyzing brightness data of the pixels in the image and detecting the edge portions, where the brightness values are greatly different from adjacent pixels. That is, in a brightness graph, in which the brightness values are plotted with respect to coordinates of the pixel positions and the plotted points are connected to each other, differentiation values of the points are calculated, and then the points having the largest differentiation value can be determined as a feature. According to the differentiation values, numerous features can be detected, and the high shutter speed images can be combined so as to coincide the positions of the features. At this time, the position of the high shutter speed image can be rotated, as well as shifted.

Figure 6:
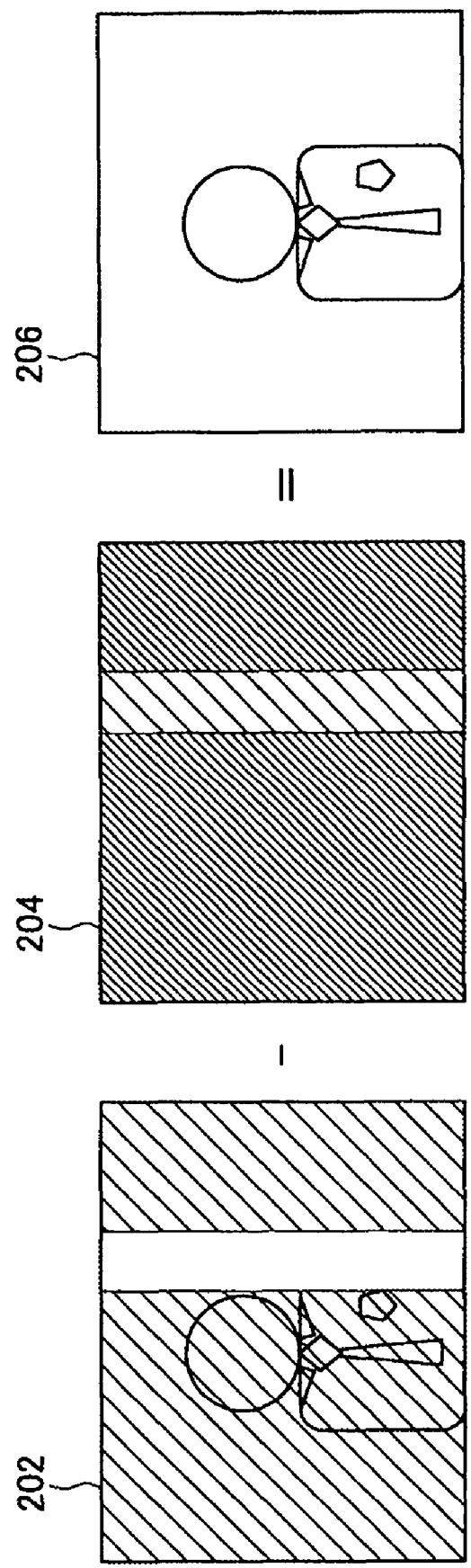
FIG. 6 is a view illustrating an example of processes of subtracting dark frames.

Next, the noise reduction method that can reduce fixed pattern noises by subtracting dark frames will be described as follows. FIG. 6 illustrates an example of the fixed pattern noise reduction method. Reference numeral 202 denotes an exposure image, and reference numeral 204 denotes a dark frame. Reference numeral 206 denotes a subtracted image obtained by subtracting the dark frame 204 from the exposure image 202.

In general, to photograph a scene with low brightness, the exposure is performed for a long time to ensure a sufficient amount of light exposure. In this case, fixed pattern noise, also referred to as dark noise, is generated in a photographing device such as a CCD or CMOS. In particular, when the exposure is performed for a long time, the fixed pattern noise is more prominent for higher temperatures. For example, as shown in exposure image 202, the noise is mixed entirely, and at the same time, a brightness stripe that is similar to an over-exposure image may be mixed partially, but the shape of the noise is not limited to a stripe. Thus, the dark frame 204 is photographed, and then, the dark frame 204 is subtracted from the exposure image 202. Consequently, the noise is removed as shown in the subtracted image 206.

Figure 7:
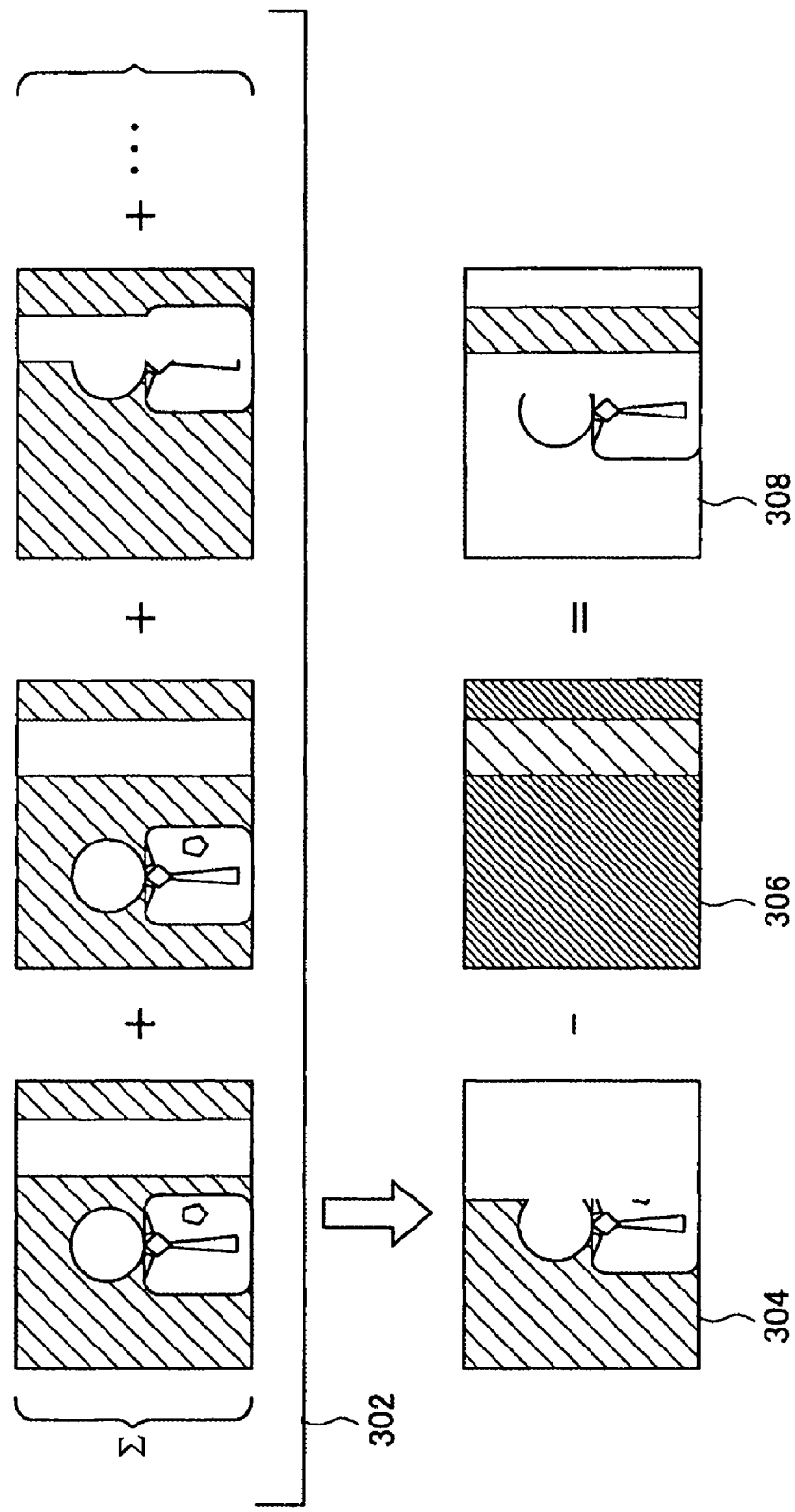
FIG. 7 is a view illustrating an example of a process of subtracting dark frames from a combined image.

However, when the noise reduction function that reduces the fixed pattern noise by subtracting the dark frame and the electronic shaking reduction function that reduces the effect of shaking by combining the time-division images are combined, an accurate noise reduction effect typically is not obtained. For example, as shown in FIG. 7, it is assumed that the dark frame is subtracted after performing the electronic shaking reduction method by combining the time-division images including the fixed pattern noises. Reference numeral 302 denotes processes of combining the time-division images that are photographed using the high shutter speed. Each of the time-division images that are photographed in the exposure status includes the fixed pattern noise. However, according to the electronic shaking reduction method, since the features are detected from the subject images and the images are combined based on the features, the fixed pattern noises are distributed and combined. Then, the position of the fixed pattern noise is distributed and the noise overlaps with each other in the combined image 304, and the position of the noise is expanded. When the dark frame 306 is subtracted from the combined image 304, a part of the expanded noise cannot be eliminated, and rather new noise is formed in the new image 308 by the noise included in the dark frame.

As described above, an effective noise reduction effect cannot be obtained by simply combining the electronic shaking reduction method and the fixed pattern noise reduction method. Therefore, according to the image pickup apparatus of an embodiment of the present invention, the noise reduction is performed by subtracting the dark frame from the time-division image, and then combining the time-division images.

Embodiment 1

Figure 8:
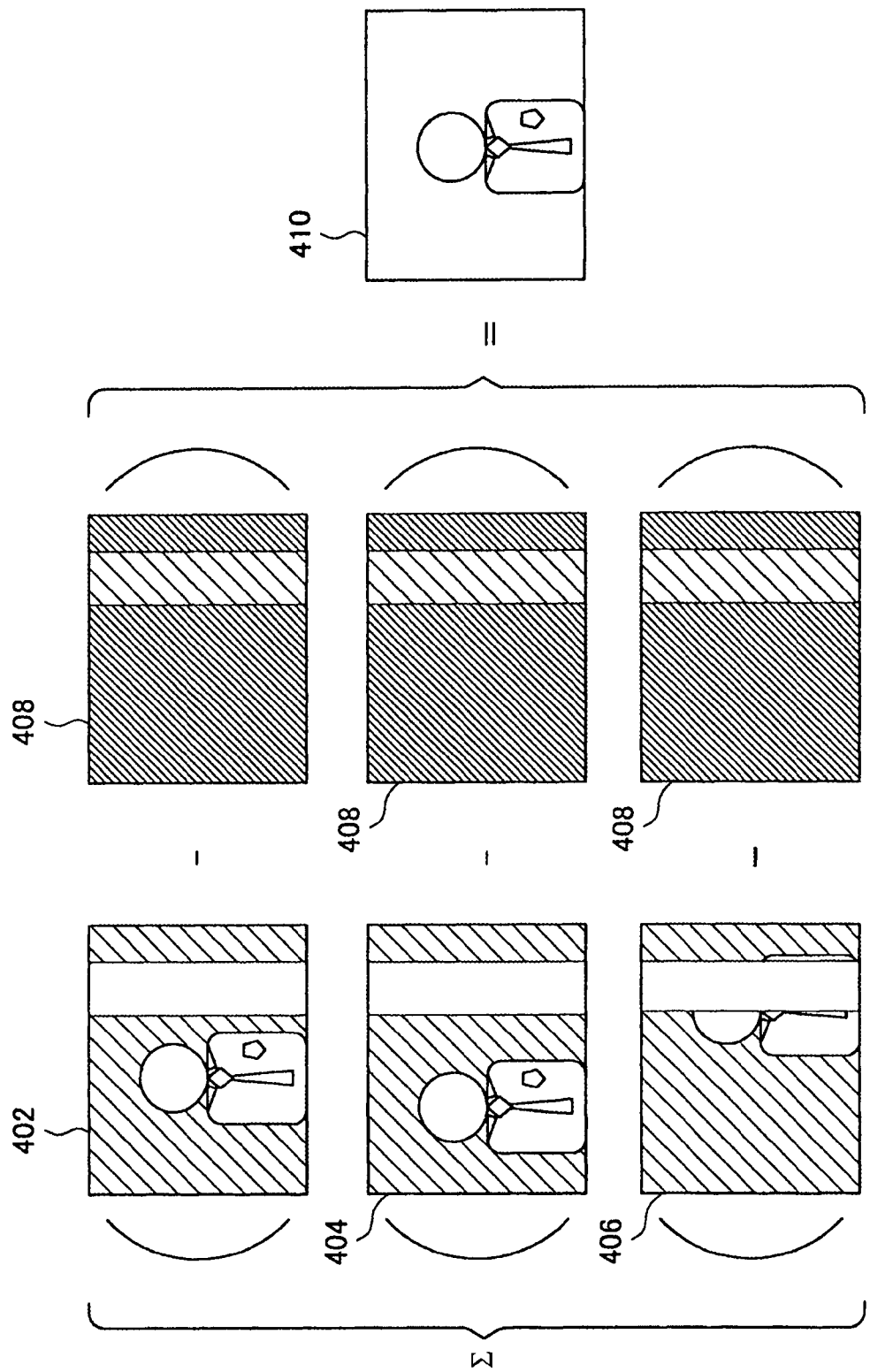
FIG. 8 is a view illustrating an example of processes of picking up images according to an embodiment of the present invention.

Referring to FIG. 8, the image pickup method according to an embodiment of the present invention will be described. FIG. 8 is a diagram illustrating an example of processes of individually subtracting the dark frame from each of the time-division images that are each photographed using the high shutter speed.

Reference numerals 402, 404, and 406 are time-division images photographed at a high shutter speed. Reference numeral 408 is a dark frame photographed in the dark state. The dark frame 408 is photographed at the same shutter speed as those of the images 402, 404, and 406 photographed in the exposure state. According to an embodiment of the present invention, the dark frame 408 is subtracted from each of the images 402, 404, and 406 to form subtracted images, and the subtracted images are combined to generate a combined image 410.

Figure 9:
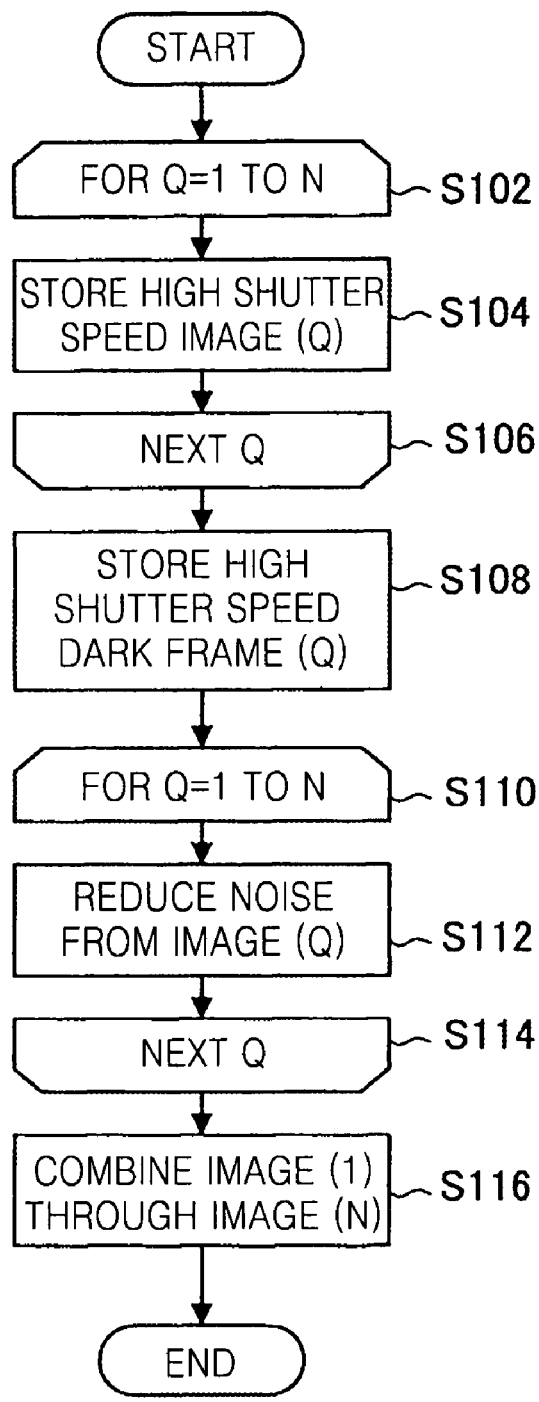
FIG. 9 is a flow chart illustrating an example of image pickup processes according to the embodiment of the present invention.

The noise reduction processes will be described with reference to FIG. 9 which is a flow chart illustrating an example of the photographing processes according to an embodiment of the present invention. It is assumed that the appropriate shutter speed, by which the appropriate exposure can be obtained, is set by the AE control in advance. In addition, it is assumed that the high shutter speed is set in advance. Moreover, the number (n) of images photographed at high shutter speed in the exposure status is calculated from a ratio between the appropriate shutter speed and a predetermined high shutter speed so that the appropriate amount of exposure can be obtained by combining the images photographed using the high shutter speed. Hereinafter, a high shutter speed image refers to the image photographed at the high shutter speed in the exposure state. In addition, it is assumed that the dark frame is photographed at the same shutter speed as that of the high shutter speed image, and referred to as the dark frame. The timing of photographing the dark frame is not limited to the first or last of the photographing process, but can be photographed at some point during photographing of the exposure images.

The photographing operation is performed at the high shutter speed in the exposure status, and n number of high shutter speed images are stored in the memory, as in Steps S102, S104, and S106. Next, after storing the high shutter speed images in the memory, one dark frame is photographed and stored in the memory in Step S108. After storing the dark frame, the dark frame is subtracted from each of the high shutter speed images to generate subtractive images as in Steps S110, S112, and S114. The same dark frame is subtracted from the high shutter speed images. Features are detected from the subtracted images based on the brightness values of the subject, and the subtracted images are combined based on the features in Step S116.

Embodiment 2

Figure 10:
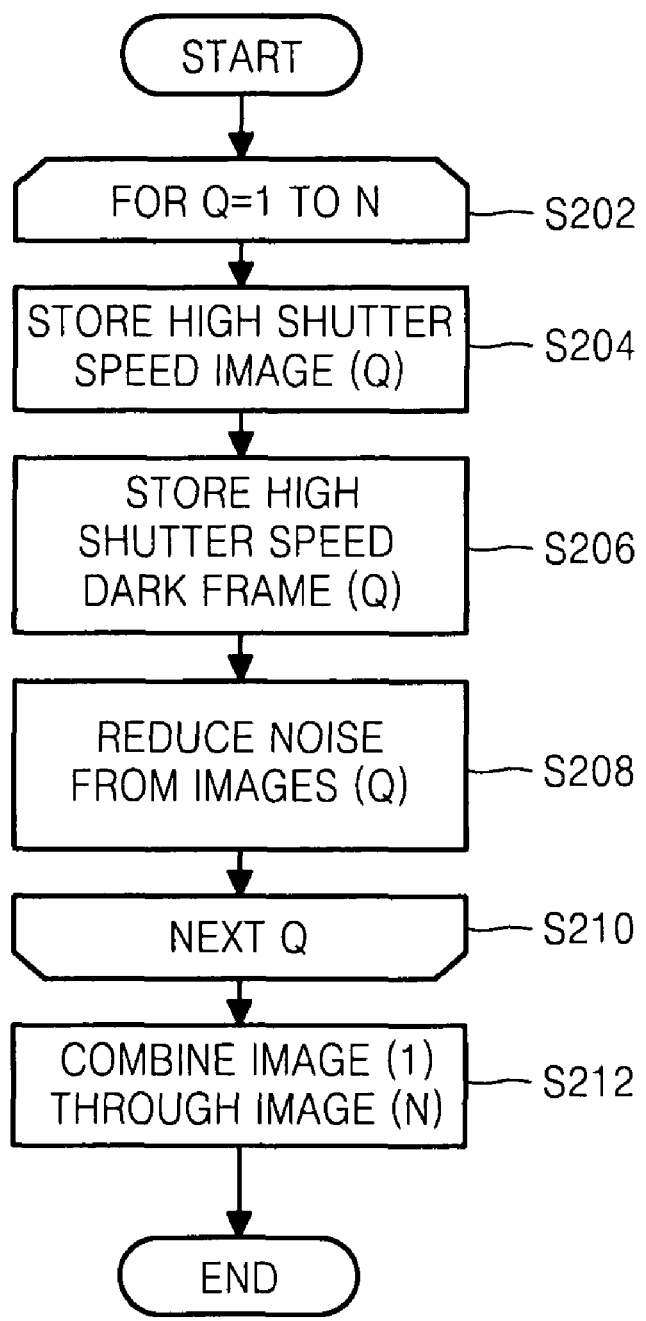
FIG. 10 is a flow chart illustrating an example of image pickup processes according to another embodiment of the present invention.

Next, an image pickup method according to another embodiment of the present invention will be described with reference to FIG. 10. FIG. 10 is a flow chart illustrating an example image pickup processes according to the current embodiment. Descriptions for portions similar to the above embodiment will be omitted.

According to this second embodiment, the n number of high shutter speed images are photographed in the exposure state and the dark frame is photographed, and then, the subtractive images are formed. According to the current embodiment, whenever one high shutter speed image is photographed and stored in the memory in Step S204, a dark frame is photographed and stored in the memory in Step S206. Moreover, whenever the dark frame is stored, the dark frame is subtracted from the high shutter speed image to generate the subtractive image in Step S208. After generating the subtracted image, the high shutter speed image and the dark frame can be eliminated from the memory. This process is repeated for the number n of images in Steps S202-S210. After that, features are detected from the subtracted images, and the subtracted images are combined based on the features in Step S212.

Comparing the image pickup method of the current embodiment with the previous embodiment, the image pickup method of the current embodiment may use additional processing time and larger memory capacity. However, a time difference between the high shutter speed image and the dark frame is small, and thus, the noise at the time when the high shutter speed image is photographed can be accurately represented by the dark frame, and a noise reduction effect of high accuracy can be expected.

Embodiment 3

Figure 11:
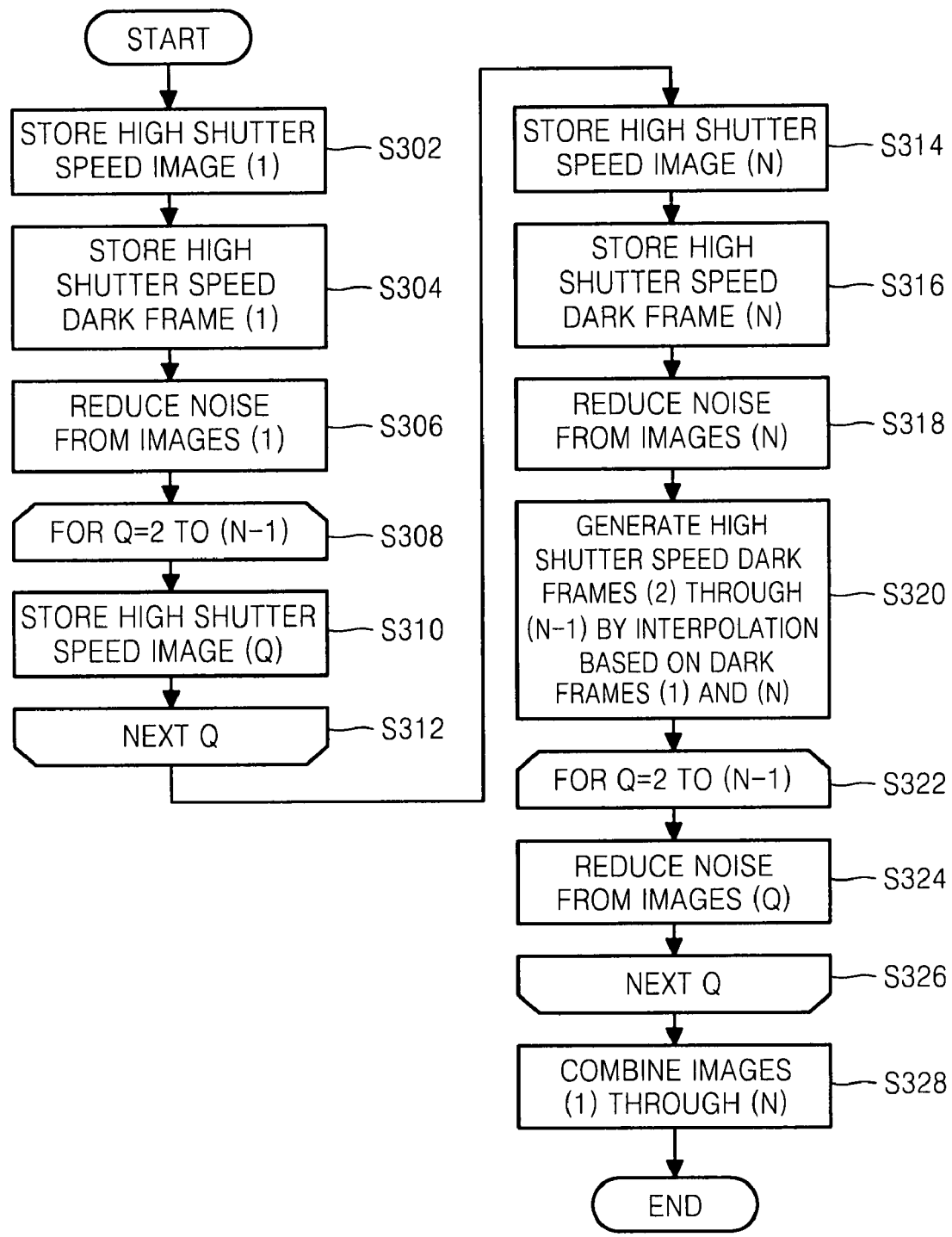
FIG. 11 is a flow chart illustrating an example of image pickup processes according to another embodiment of the present invention.

An image pickup method according to another embodiment of the present invention will be described with reference to FIG. 11, which is a flow chart illustrating an example of image pickup processes according to the current embodiment. Descriptions for the portions similar to those of the above embodiments will be omitted.

As described above, according to the first embodiment, one dark frame is photographed, and thus, the noise reduction process can be performed at high speed and only a small memory capacity is required. In addition, according to the second embodiment, the time difference between the high shutter speed image and the dark frame is small, and the noise reduction can be performed accurately. Therefore, according to this third embodiment, a first dark frame is photographed after photographing a first high shutter speed image, a second dark frame is photographed after photographing a last (nth) high shutter speed image, and then, an interpolation calculation is performed based on the first and second dark frames to generate intermediate dark frames. Hereinafter, the q-th image will be referred to as image(q).

First, a high shutter speed image(1) is photographed and stored in the memory in Step S302. In addition, a dark frame (1) is photographed and stored in the memory in Step S304. After that, the dark frame(1) is subtracted from the high shutter speed image(1) to generate a subtracted image(1) in Step S306.

Next, high shutter speed images(q) (for q=2~n−1) are photographed and stored in the memory in Steps S308, S310, and S312. Then, a high shutter speed image(n) is photographed and stored in the memory in Step S314. In addition, a dark frame(n) is photographed and stored in the memory in Step S316, and then, the dark frame(n) is subtracted from the high shutter speed image(n) to generate a subtractive image(n) in Step S318.

Then, dark frames(q) (for q=2~n−1) corresponding to each of the high shutter speed images(q) are generated based on the dark frames(1) and (n) in Step S320. In more detail, a dark frame(q) at the time when the high shutter speed image(q) is photographed and stored in the memory is calculated through the interpolation. In general, a position of the fixed noised in the image is rarely changed. However, the brightness of the fixed noise changes for the photographing of the later images in case of lengthy photographing. Therefore, brightness values of pixels in the dark frame(n) corresponding to the brightness values of the pixels in the dark frame(1) are plotted as time series data, and the two points are connected to each other by a straight line to obtain a brightness value of the dark frame corresponding to a specific time point. That is, a linear interpolation between the dark frame(1) and the dark frame (n) can be performed. If the high shutter speed images are photographed with constant time intervals, a section between the two points are divided by the number of photographed images to calculate the brightness values of the dark frames (q). If a characteristic curve representing the change in the brightness values according to the photographing time is known, the section between the two points can be interpolated using the characteristic curve and the subtractive images can thus be formed. In addition, the interpolation can be performed using a predetermined non-linear function. For example, an m-th (m≧2) function can be used to interpolate. In a case where a predetermined characteristic curve or line is used, there is no limitation in the timing and the number of photographing dark frames, and brightness values of the pixels can be shifted or amplified according to the level of the dark frame received during the photographing. When a plurality of dark frames, corresponding to the number of frames required, are photographed at predetermined intervals, the dark frame corresponding to a frame that is not photographed can be substituted by the dark frame that is the closest to that frame.

When the dark frames(q) (for q=2~n−1) are generated by the interpolation, the dark frames (q) are subtracted from the high shutter speed images (q) to generate the subtracted images(q) in Steps S322, S324, and S326. After that, features are detected from the subtracted image (1) through the subtracted image (n), and the subtracted images are combined based on the features in Step S328. As described above, the subtracted images are formed using the interpolated dark frames, and thus, the noise reduction can be performed at the high speed without decreasing accuracy.

Embodiment 4

Figure 12:
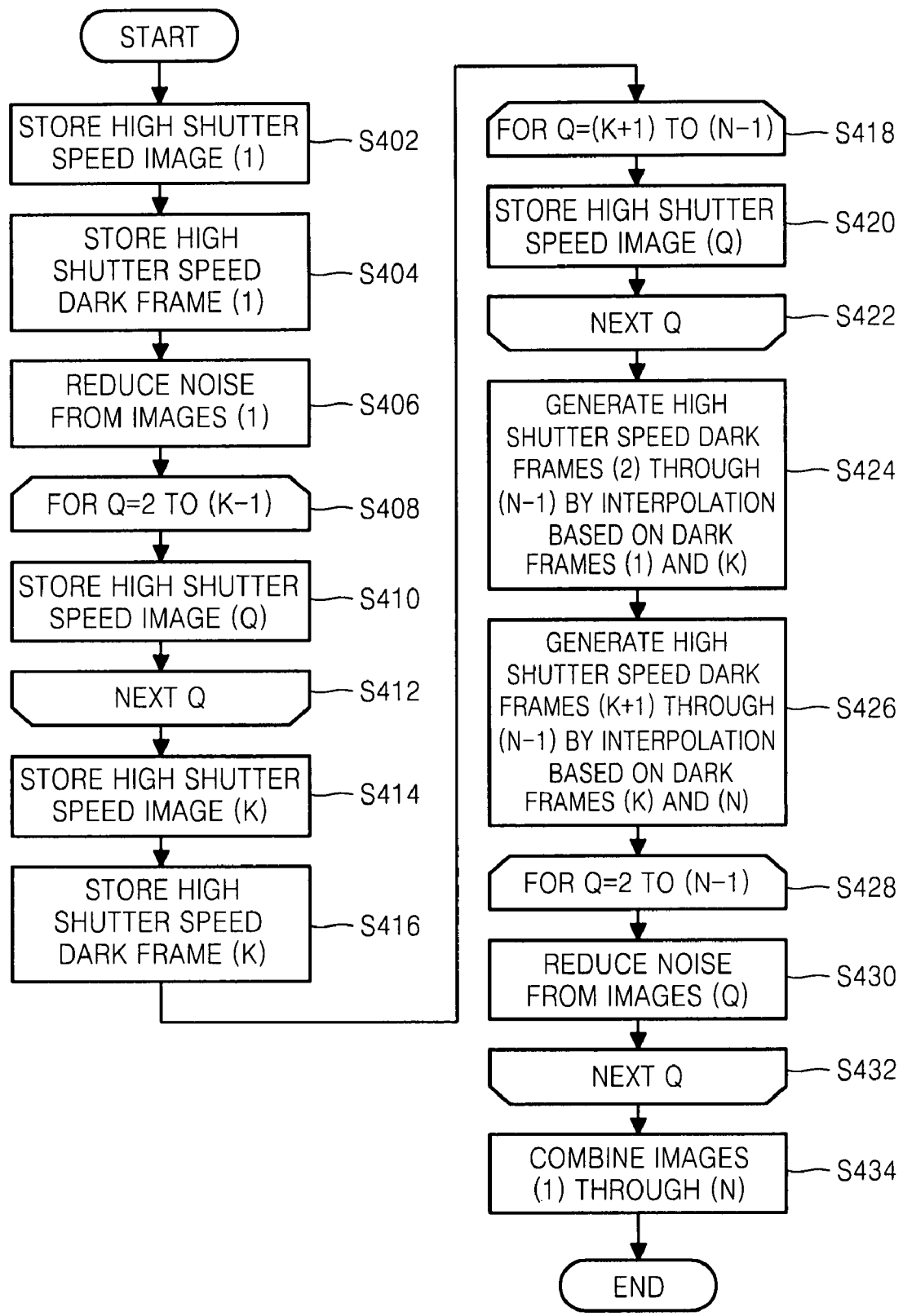
FIG. 12 is a flow chart illustrating an example of image pickup processes according to another embodiment of the present invention.

Next, an image pickup method according to another embodiment of the present invention will be described with reference to FIG. 12. FIG. 12 is a flow chart illustrating an example of image pickup processes according to this embodiment. Descriptions for portions similar to those of the above embodiments will be omitted.

According to the previous embodiment, the dark frames (q) between the dark frame (1) and the dark frame (n) are formed through the interpolation, and then, are subtracted from the high shutter speed images to reduce the noise. However, according to this method, if there is a strong non-linearity in the time dependant change of the noise characteristics, the expected noise reduction effect may not be accurately calculated. According to the environment of using the image pickup apparatus, the time dependency of noise may be changed. Therefore, according to this fourth embodiment, a number of dark frames can be used as references to calculate the interpolation corresponding to the non-linearity of the noise characteristic curve.

A high shutter speed image(1) is photographed and stored in the memory in Step S402. In addition, a dark frame (1) is photographed and stored in the memory in Step S404. Then, the dark frame (1) is subtracted from the high shutter speed image (1) to generate a subtracted image (1) Step S406.

Next, high shutter speed images (q) (for q=2~k−1, 3≦k≦n−2, n≧5) are photographed and stored in the memory in Steps S408, S410, and S412. After that, a high shutter speed image (k) is photographed and stored in the memory in Step S414. In addition, a dark frame (k) is photographed and stored in the memory in Step S416.

Next, high shutter speed images (q) (for q=k+1~n−1) are photographed and stored in the memory in Steps S418, S420, and S422.

Then, dark frame (2) through dark frame (k−1) are generated based on interpolation between the dark frames (1) and (k) in Step S424. In addition, dark frame (k+1) through dark frame (n−1) are generated based on interpolation between the dark frames (k) and (n) in Step S426. The interpolation processes can be the same as those of the previous embodiment.

When the dark frames (q) (q=2~k−1, k+1~n−1) are formed through the interpolation, the dark frames (q) are subtracted from the corresponding high shutter speed images (q) to generate the subtractive images (q) in Steps S428, S430, and S432. Then, features are detected from the subtractive images (1) through (n), and the subtractive images are combined based on the features in Step S434. As described above, three or more interpolated dark frames are used to generate the subtractive images, the noise reduction can be performed accurately even when the noise increases non-linearly. The interpolation based on the dark frames photographed at three time points is described above, however, the photographing points are not limited to the three points. If stronger non-linearity is represented in the noise increasing characteristics, more dark frames can be used to perform the interpolation. In addition, k can be determined as an intermediate number between 1 and n, however, can be determined as an earlier or later number according to the noise characteristics.

Embodiment 5

Figure 13:
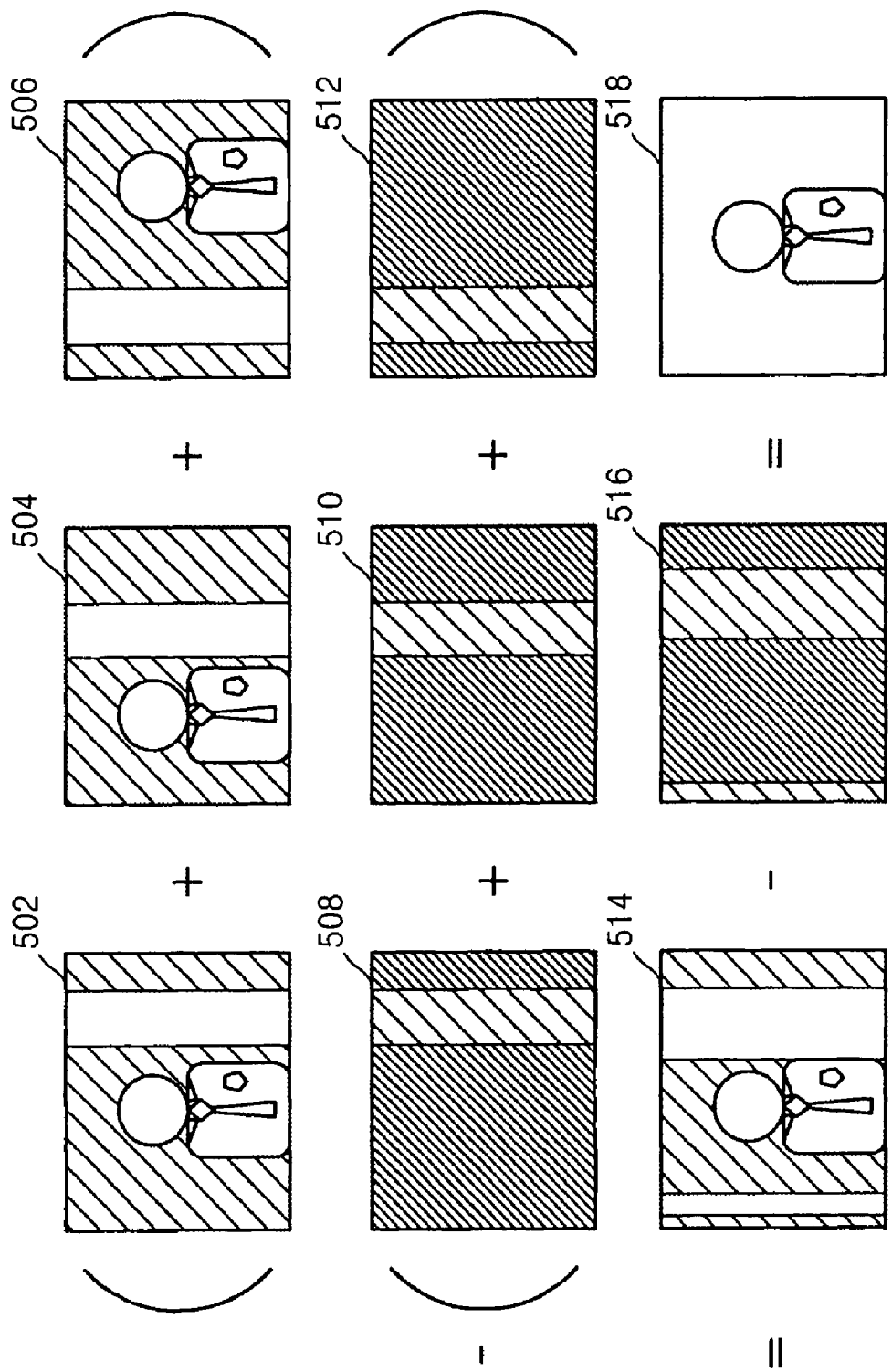
FIG. 13 is a view illustrating an example of image pickup processes according to another embodiment of the present invention.

An image pickup method according to another embodiment of the present invention will be described with reference to FIG. 13 which is a diagram illustrating an example of image pickup processes according to this embodiment. Descriptions for similar portions to the above embodiments will be omitted.

In the image pickup method according to the above embodiments, the dark frames are subtracted from the high shutter speed images respectively to generate subtracted images, and then, the subtracted images are combined. According to the this fifth embodiment, the high shutter speed images 502, 504 and 506, the positions of which are adjusted based on features, are combined, and then, the dark frames 508, 510 and 512, the positions of which are adjusted, are combined. After that, the subtracted images are generated based on the combined images to reduce the noise. Therefore, the image pickup method of this embodiment can be applied to the dark frames obtained by the image pickup method of the previous embodiments. In this case, adjustment information of the images such as a pixel movement amount or a rotating angle for adjusting positions of the high shutter speed images is maintained. Based on the maintained adjustment information, the dark frames are adjusted and combined. At the same time, the combined image 514 of the high shutter speed images is formed, and the combined image 516 of the dark frames is subtracted from the above combined image to generate the subtracted image 518, the noise of which is reduced. Therefore, the noise reduction can be performed all at once.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image pickup apparatus for electronically reducing an effect of shaking by combining a plurality of images that are photographed at predetermined time intervals using time-division exposure, the apparatus comprising:
   an exposure photographing unit for photographing exposure images at predetermined time intervals using time-division exposure in a light exposure state;
   a dark frame photographing unit for photographing at least one dark frame at at least one predetermined time interval using time-division exposure in a dark state;
   a subtracting processor for subtracting the at least one dark frame from the exposure images to reduce noise in the exposure images and produce reduced noise exposure images; and
   an image combiner for combining the reduced noise exposure images.

2. The apparatus of claim 1, wherein the dark frame photographing unit photographs one dark frame, and the subtracting processor subtracts the one dark frame from each of the exposure images that are photographed at predetermined time intervals using time-division exposure to reduce noise in the exposure images.

3. The apparatus of claim 1, wherein the exposure photographing unit and the dark frame photographing unit photograph the exposure images and the dark frames alternately, and the subtracting processor subtracts the corresponding dark frames, which are photographed immediately after their corresponding exposure images are photographed, from the corresponding exposure images to reduce the noise in the corresponding exposure images.

4. The apparatus of claim 1, further comprising:
   a dark frame interpolating unit for performing an interpolation based on at least two dark frames, and generating a dark frame corresponding to at least one point in time between when the dark frames are photographed,
   wherein the subtracting processor subtracts the dark frame obtained by the interpolation from the exposure images to reduce the noise in the exposure images.

5. The apparatus of claim 4, wherein:
   the interpolation is a linear interpolation.

6. The apparatus of claim 4, wherein:
   the interpolation is a non-linear interpolation.

7. The apparatus of claim 4, wherein:
   the dark frame interpolating unit performs the interpolation based on brightness values of pixels of the at least two dark frames.

8. An image pickup method of electronically reducing an effect of shaking by combining a plurality of images photographed at predetermined time intervals using time-division exposure, the method comprising:
   photographing exposure images at predetermined time intervals using time-division exposure in a light exposure state;
   photographing at least one dark frame at at least one predetermined time interval using time-division exposure in a dark state;
   subtracting the at least one dark frame from the exposure images to reduce noise in the exposure images and produce reduced noise exposure images; and
   combining the reduced noise exposure images.

9. The method of claim 8, wherein in the photographing of the at least one dark frame, one dark frame is photographed using time-division exposure, and in the subtracting of the images, the dark frame is subtracted from each of the exposure images photographed at predetermined time intervals using time-division exposure to reduce the noise in the exposure images.

10. The method of claim 8, wherein in the photographing of the exposure images and the photographing of the dark frames, the exposure images and the dark frames are photographed alternately, and in the subtracting of the images, for each exposure image, the corresponding dark frame that is photographed immediately after its corresponding exposure image is photographed is respectively subtracted from the corresponding exposure image.

11. The method of claim 8, further comprising:
performing an interpolation based on at least two dark frames, and generating a dark frame corresponding to at least one point in time between when the two dark frames are photographed,
wherein the subtracting of images, for each exposure image, is performed by subtracting, from an exposure image, a corresponding dark frame obtained by the interpolation to reduce the noise in the exposure image.

12. The method of claim 11, wherein:
the interpolation is a linear interpolation.

13. The method of claim 11, wherein:
the interpolation is a non-linear interpolation.

14. The method of claim 11, wherein:
the interpolation is performed based on brightness values of pixels of the at least two dark frames.

* * * * *